Feb. 9, 1937. W. J. PEARMAIN 2,070,065
CLUTCH
Filed June 13, 1935 2 Sheets-Sheet 1
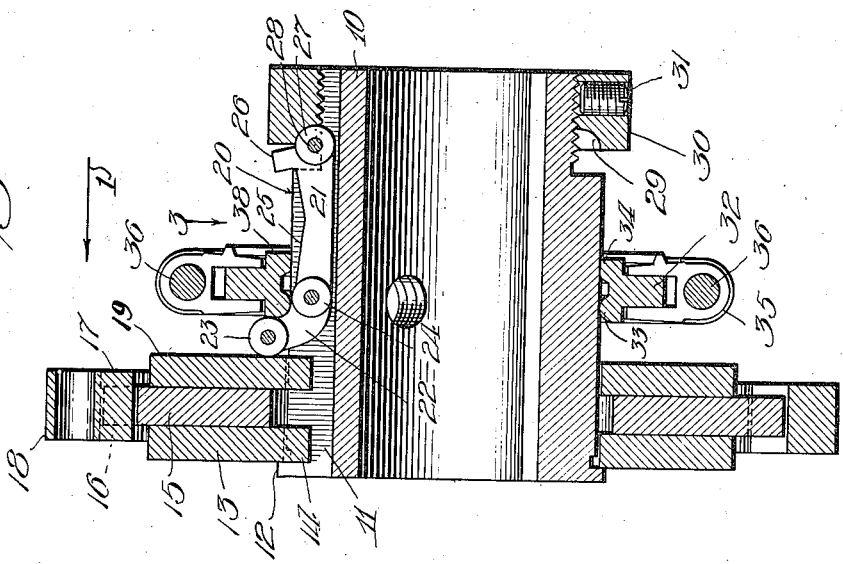
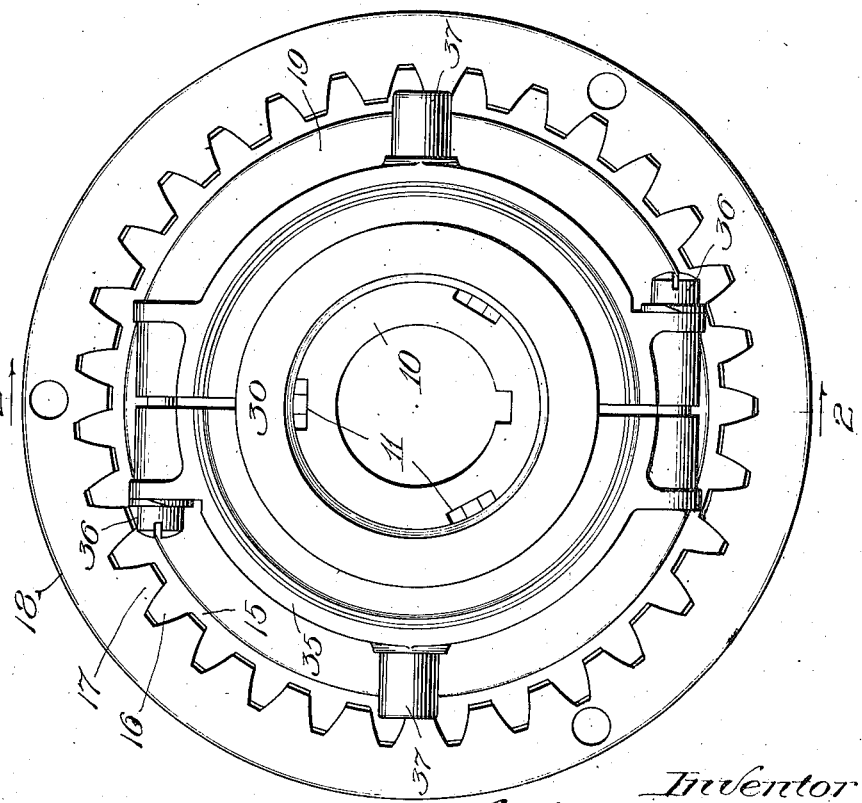
Inventor:
William J. Pearmain
by Davis, Macauley, May, Lindsey & Smith
Attys.

Feb. 9, 1937.  W. J. PEARMAIN  2,070,065
CLUTCH
Filed June 13, 1935  2 Sheets-Sheet 2
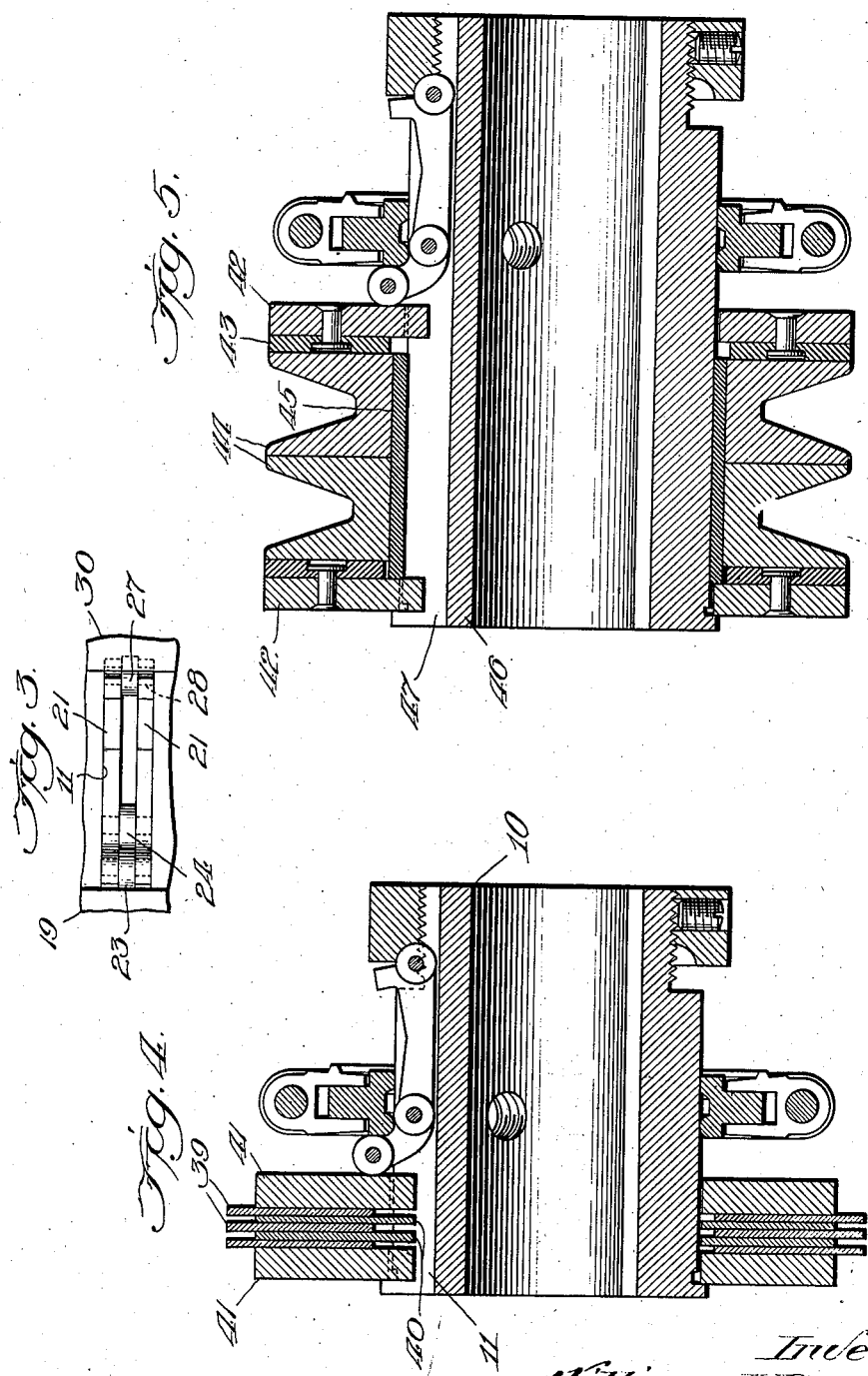
Inventor:
William J. Pearmain
by Davis, Macauley, May, Lindsey & Smith
Attys.

Patented Feb. 9, 1937

2,070,065

UNITED STATES PATENT OFFICE 2,070,065

CLUTCH

William J. Pearmain, Racine, Wis., assignor to Twin Disc Clutch Company, Racine, Wis., a corporation of Wisconsin Application June 13, 1935, Serial No. 26,395

13 Claims. (Cl. 192—68)

My invention relates to clutches and more particularly to a device of this type which is mechanically or positively actuated into driving position, as contrasted with clutches of the spring loaded type.

One object of my invention is to devise a clutch of the plate type having operating mechanism for mechanically engaging the same which tends to release under the impulse of centrifugal force so that the clutch runs free in the disengaged position.

A further object is the provision of an operating mechanism having levers which are characterized by a floating or wandering action, as compared with the usual fixed pivot construction, thus enabling the levers to position themselves for the easiest operation possible.

A further object is to provide a clutch of the type indicated which is characterized by compactness, a high degree of efficiency, a capacity for being embodied in various specific adaptations to meet different operating conditions, and which is susceptible of rapid production due to the fact that numerous parts are either simple stampings, or capable of automatic manufacture.

Additional objects are the securement in a compact clutch structure of an adequate mechanical advantage in the operating mechanism for insuring the application of the required clamping pressure, ease of adjustment as the plates wear, a positive locking of the clutch plates in driving position, and a positive release of the clutch levers during disengagement.

These and further objects of my invention will be set forth in the following specification, reference being had to the accompanying drawings, and the novel means by which said objects are effectuated will be definitely pointed out in the claims.

In the drawings:

Figure 1 is an end view of one form of my improved clutch as viewed in the direction of the arrow 1 in Fig. 2.

Fig. 2 is a sectional elevation taken along the line 2—2 in Fig. 1, looking in the direction of the arrows.

Fig. 3 is a plan view of one of the clutch levers, as viewed in the direction of the arrow 3 in Fig. 2.

Figs. 4 and 5 are sectional elevations, corresponding to that illustrated in Fig. 2, showing adaptation of my improved clutch operating mechanism to other types of clutch construction.

Referring to Figs. 1 to 3, inclusive the numeral 10 designates a hub which is intended to be keyed or otherwise secured to a shaft (not shown) and which, in the present instance, will be regarded as the driven member of the clutch, although the construction is not limited in that respect, since the hub 10 may be utilized as the driving member without interfering with the efficient and positive operation of the clutch. The periphery of the hub is provided with a plurality of keyways 11 that are preferably equi-spaced and also, at the left end thereof, as viewed in Fig. 2, with an annular flange 12 that constitutes an abutment for one of the clamping plates 13. The plate 13 is provided with teeth 14 that interfit with the keyways 11 and so compel the plate to partake of the rotary motion of the hub 10, while permitting an endwise shifting of the plate along the hub.

The plate 13 is intended to frictionally engage with one side of a driving plate 15 which is here shown as being of the molded type and composed of a suitable frictional material, although the construction is not restricted to this precise plate construction, since there may be substituted a metallic plate having frictional facings on the opposite sides thereof, as is common in clutches of this type. The plate 15 is provided with a plurality of peripheral teeth 16 that have driving engagement with similar teeth 17 provided on a ring 18 that may be suitably attached to a driving member, such as a flywheel (not shown) or other form of driving member. The opposite surface of the driving plate 15 is engaged by a second clamping plate 19 that is formed similarly to the plate 13 and has the same operative relation to the hub 10.

From the foregoing, it will be understood that the capacity for endwise movement of the clamping plates 13 and 19, and the driving plate 15, enables these plates to be freely engaged to transmit drive through the clutch and also to be freely disengaged automatically when the clamping pressure is removed. In the construction shown in Fig. 2, the clamping plate 13 is shown as being adapted for endwise movement along the hub 10, but this plate could be fixed against endwise movement owing to the fact that the plates 15 and 19 are arranged to move endwise freely.

The particularly novel feature of my clutch construction resides in the operating mechanism which comprises a plurality of clutch levers 20, each of which is composed of a pair of spaced plates 21 that is mounted in one of the keyways 11. Each plate 21 has a free, sliding fit with the side walls of the associated keyway 11 and the arrangement is such that each lever 20 is generally housed in one of the keyways, except for arms 22 which project outwardly therefrom and each of which is formed on one of the plates 21. The arms 22 extend outwardly from the hub 10 in juxtaposition to the clamping plate 19 and rotatably supported between these arms is a roller 23 which is intended to bear against the clamping plate 19. Adjacent the point where the arms 22 merge with the plates 21 is a roller 24 that is rotatably supported between the plates and whose periphery extends above, as indicated in Fig. 2, or generally beyond the outer edge of the clutch lever plates 21. To the right of the roller 24, as indicated in Fig. 2, the outer surface of each plate 21 inclines inwardly toward the axis of the hub 10 to provide an inclined surface 25 for a purpose presently explained. This inclination extends for a predetermined distance and then outwardly again to a point adjacent the right end of the clutch lever 20 and at this point a stub arm 26 projects sharply outwardly from the hub 10 and beyond the periphery of the hub. At the right end of each clutch lever, there is rotatably supported between the plates 21 a third roller 27, the support being provided by integral pintles 28. Similar pintles are employed to support the rollers 23 and 24. The rollers 27 are seated in and intended to bear against an annular groove 29 that is arcuate-shaped in cross-section and which is provided in an adjusting ring 30 that is threaded on the right end of the hub 10, as viewed in Fig. 2. The adjusted position of the ring 30 may be maintained by a set screw 31.

It will therefore be understood that endwise movement of the clutch levers 20 is limited by the clamping plate 19 and the adjusting ring 30 and that within these limits, the levers are free to move, or, in other words, the levers 20 are not restrained by any fixed pivot connection to the hub 10, but they are capacitated for a free, rocking movement relative to the adjusting ring 30.

In order to restrain the levers 20 against radial movement under the impulse of centrifugal force and to operate these levers, a collar 32 is provided which encircles the hub 10, inclusive of the clutch levers 20, and the inner periphery of this collar is shaped to provide an annular bead 33 and spaced therefrom an annular, flat boss 34 which provides a bearing for the collar on the hub. Endwise shifting of the collar 32 along the hub 10 is achieved by means of ring segments 35 which grippingly encircle the collar and are held together by means of cap screws 36. Each segment is provided with a trunnion 37 which is intended to be engaged by a suitable shifting member (not shown).

The operation of the clutch above described will now be explained. As illustrated in Fig. 2, the clutch is in driving position. Under this condition of operation, centrifugal force maintains the clutch levers 20 outwardly from the bottom of the keyways 11 and the rollers 27 in seating engagement with the groove 29. The collar 32 occupies the position illustrated in Fig. 2, that is, it has moved the rollers 23 into clamping engagement with the plate 19 and has therefore established a frictional, driving engagement between the driving plate 15 and the clamping plates 13 and 19. The bead 33 occupies a position slightly to the left of the vertical center line of the roller 24, as illustrated in Fig. 2, and a corresponding position with reference to the other rollers 24, so that, by reason of the relation of the peripheries of the rollers 24 to the top surfaces of the clutch lever plates 21, in conjunction with the action of centrifugal force, the collar 32 will be locked in position against any tendency towards inadvertent shifting toward the right. Accordingly, the operation of the clutch, when in driving position, tends to maintain the clutch plates in the driving position.

To release the clutch, the collar 32 is moved toward the right, as viewed in Fig. 2, the bead 33 being forced over the rollers 24, until the collar face 38 contacts with the stub arms 26. Continued movement of the collar 32 therefore rocks the clutch levers 20 outwardly, as permitted by the rocking capacity of these levers with respect to the adjusting ring 30. The rollers 23 are accordingly moved free of the clamping plate 19, thus enabling this plate, together with the other clamping plate 13 and the driving plate 15 to automatically separate themselves and establish sufficient clearance for the plate 15 to run free in the disengaged position.

When the clutch levers 20 are in the disengaged position, the surfaces 25 present more of an inclination, relatively speaking, to the bead 33, than they do when occupying the positions shown in Fig. 2. Because of this fact, in conjunction with the substantially pivotal relation of the clutch levers 20 to the adjusting ring 30, it is possible to obtain, within the relatively compact structure shown, the required mechanical advantage to secure the desired frictional contact between the clamping and driving plates of the clutch when the collar 32 is moved to the position illustrated in Fig. 2. During this movement, the bead 33 moves along the inclined surfaces 25 and presses the clutch levers 20, which fulcrum on the adjusting ring, inwardly toward the axis of the hub 10 and finally rides over the peripheries of the rollers 24 to become locked in the position shown. As the driving plate 15 wears, the required adjustment can be easily effected by the ring 30, which is moved so as to maintain the seating relation between the rollers 27 and the groove 29 and thereby retain the free action of the clutch levers 20 in the adjusted position.

Because of the capacity of the clutch levers 20 to move freely within the keyways 11, they readily accommodate themselves to the several positions required under the different operating conditions, thus avoiding any undue strain on the parts of the clutch. The clutch construction is very compact, but does not sacrifice any of the mechanical advantages normally required in devices of this type. One of the most important features of the construction is its relatively low cost of construction, since the majority of the parts may be either made as simple stampings, such as the clutch lever plates 21; the clamping plates are duplicates, as are the rollers 23, 24 and 27, while the collar 32 and the adjusting ring 30 may be manufactured by automatic machinery. A further advantage resides in the fact that the same keyways are employed to provide a driving engagement with the clamping members 13 and 19 and also to provide recesses for the clutch levers 20. Moreover, as soon as the bead 33 has cleared the rollers 24, when moving toward the right, as viewed in Fig. 2, the pressure on the clamping and driving plates is relieved by reason of the outward movement of the clutch levers under the impulse of centrifugal force.

In Figs. 4 and 5 are illustrated the adaptation of my improved clutch construction to other types of clutches. In Fig. 4, there is illustrated a multiple disc type of clutch comprising discs 39 which are arranged in alternate relation to discs 40, the former being intended for engagement with a driving member (not shown), while the latter plates are arranged for a driving interfit with the keyways 11 provided on the hub 10. Clamping members 41 are located on opposite sides of the group of multiple discs, while the remainder of the clutch construction is identical with that illustrated in Fig. 2. In Fig. 5, a pair of spaced clamping members 42 is employed, and each plate has affixed to the opposing faces thereof frictional facings 43 which are intended to engage with the adjacent surfaces of sheaves 44 that rotate freely on a suitable bushing 45 provided on the hub 46. It will be understood that the clamping members 42 correspond to the clamping plates 13 and 19 and therefore possess interfitting engagement with keyways 47, corresponding to the keyways 11. Each of the sheaves 44 may be provided with a V-shaped groove for receiving a belt of corresponding cross-sectional shape. The action of the clutch shown in Fig. 5, and the operating mechanism therefor, is identical with that heretofore described in connection with the form illustrated in Fig. 2.

I claim:

1. In a clutch, the combination of a friction plate, clamping plates adapted to engage the opposite sides of the friction plate, a hub to which the clamping plates are connected for rotation therewith and for axial movement relative thereto of one of the clamping plates and having depressions disposed around the periphery thereof, an adjusting ring mounted on the hub clutch levers in the depressions adapted to press the plates into engagement and free of any connection to the hub, and means for actuating the levers and for retaining the same in the depressions, one end of each lever pressing against the adjacent clamping plate and the other fulcruming against the ring.

2. In a clutch, the combination of a friction plate, clamping plates adapted to engage the opposite sides of the friction plate, a hub to which the clamping plates are connected for rotation therewith and for axial movement relative thereto of one of the clamping plates, an adjusting ring mounted on the hub, clutch levers adapted to press the plates into engagement and mounted for rotation with and free movement relative to the hub, the levers being unconnected to the hub, and means for actuating the levers and for retaining the same in operative association with the hub, one end of each lever pressing against the adjacent clamping plate and the other fulcruming against the ring.

3. In a clutch, the combination of a friction plate, clamping plates adapted to engage the opposite sides of the friction plate, a hub to which the clamping plates are connected for rotation therewith and for axial movement relative thereto of one of the clamping plates and having depressions disposed around the periphery thereof, an adjusting ring mounted on the hub clutch levers in the depressions adapted to press the plates into engagement and free of any connection to the hub, ring means encircling the hub including the levers for actuating and retaining the same in the depressions, one end of each lever pressing against the adjacent clamping plate and the other fulcruming against the ring.

4. In a clutch, the combination of a friction plate, clamping plates adapted to engage the opposite sides of the friction plate, a hub having a plurality of exteriorly disposed keyways for drivably connecting the clamping plates thereto and to permit axial movement of one of the clamping plates relative to the hub, clutch levers in the keyways adapted to press the plates into engagement, and means for actuating the levers and for retaining the same in the keyways.

5. In a clutch, the combination of a friction plate, clamping plates adapted to engage the opposite sides of the friction plate, a hub having a plurality of exteriorly disposed depressions for drivably connecting at one end thereof the clamping plates and to permit axial movement of one of the clamping plates relative to the hub, an adjusting ring mounted on the opposite end of the hub, clutch levers mounted freely in the depressions between the ring and adjacent clamping plate, and means for actuating the levers to press the plates into engagement, one end of each lever pressing against the adjacent clamping plate and the other fulcruming against the ring.

6. In a clutch, the combination of a friction plate, clamping plates adapted to engage the opposite sides of the friction plate, a hub having a plurality of exteriorly disposed keyways extending the length thereof for drivably connecting at one end of the hub the clamping plates thereto and to permit axial movement of one of the clamping plates relative to the hub, an adjusting ring mounted on the opposite end of the hub, clutch levers mounted freely in the keyways between the ring and adjacent clamping plate, and means for actuating the levers to press the plates into engagement, one end of each lever pressing against the adjacent clamping plate and the other fulcruming against the ring.

7. In a clutch, the combination of a friction plate, clamping plates adapted to engage the opposite sides of the friction plate, a hub to which at one end the clamping plates are connected for rotation therewith and for axial movement relative thereto of one of the clamping plates and having a plurality of exteriorly disposed keyways, an adjusting ring mounted on the opposite end of the hub, a clutch lever mounted freely in each keyway and having an outwardly directed arm adjacent one clamping plate and an abutment adjacent the ring, a first roller pivoted on the lever and adapted to seat against the ring whereby the lever is capacitated for rocking movement relative to the hub, a second roller pivoted on the lever arm and adapted to press against the adjacent clamping plate, and a collar encircling the hub including the clutch levers to limit outward displacement of the same by centrifugal force, the collar being shiftable in one direction to press the second rollers against the adjacent clamping plate and in the opposite direction to engage the lever abutments whereby the levers are rocked to released position.

8. In a clutch, the combination of a friction plate, clamping plates adapted to engage the opposite sides of the friction plate, a hub to which at one end the clamping plates are connected for rotation therewith and for axial movement relative thereto of one of the clamping plates and having a plurality of exteriorly disposed keyways, an adjusting ring mounted on the opposite end of the hub, a clutch lever mounted freely in each keyway and having an outwardly directed arm adjacent one clamping plate and an abutment adjacent the ring, a first roller pivoted on the lever and adapted to seat against the ring whereby the lever is capacitated for a rocking movement relative to the hub, a second roller pivoted on the lever arm and adapted to press against the adjacent clamping plate, a third roller pivoted on the lever and positioned to extend beyond the outer edge of the lever, and a collar encircling the hub including the clutch levers to limit outward displacement of the same by centrifugal force, the collar being shiftable in one direction to press the second rollers against the adjacent clamping plate and having a portion for riding over the third rollers, the collar being locked in clutch engaging position by the interaction of the third rollers and collar portion, and the collar being shiftable in the opposite direction to engage the lever abutments whereby the levers are locked to released position.

9. In a clutch, the combination of a friction plate, clamping plates adapted to engage the opposite sides of the friction plate, a hub to which at one end the clamping plates are connected for rotation therewith and for axial movement relative thereto of one of the clamping plates and having a plurality of exteriorly disposed keyways, an adjusting ring mounted on the opposite end of the hub, a clutch lever mounted freely in each keyway and having at one end a roller adapted to press against the adjacent clamping plate and at the opposite end adapted for free rocking movement on the adjusting ring, the intermediate portion of the lever being provided with a surface inclining outwardly toward the roller, and a collar encircling the hub including the clutch levers to limit outward displacement of the same by centrifugal force, the collar being shiftable in one direction to ride along the inclined surfaces of the levers to thereby rock the same and press the rollers against the adjacent clamping plate.

10. In a clutch, the combination of a friction plate, clamping plates adapted to engage the opposite sides of the friction plate, a hub to which at one end the clamping plates are connected for rotation therewith and for axial movement relative thereto of one of the clamping plates and having a plurality of exteriorly disposed keyways, an adjusting ring mounted on the opposite end of the hub, a clutch lever mounted freely in each keyway and having at one end a roller adapted to press against the adjacent clamping plate and at the opposite end adapted for free rocking movement on the adjusting ring, an abutment on the lever adjacent the ring, the intermediate portion of the lever being provided with a surface inclining outwardly towards the roller, and a collar encircling the hub including the clutch levers to limit the outward displacement of the same by centrifugal force, the collar being shiftable in one direction to ride along the inclined surfaces of the levers to thereby rock the same and press the rollers against the adjacent clamping plate and in the opposite direction to engage the lever abutments whereby the levers are rocked to released position.

11. In a clutch, the combination of a friction plate, clamping plates adapted to engage the opposite sides of the friction plate, a hub to which at one end the clamping plates are connected for rotation therewith and for axial movement relative thereto of one of the clamping plates and having a plurality of exteriorly disposed keyways, an adjusting ring mounted on the opposite end of the hub, a clutch lever mounted freely in each keyway and having at one end a first roller adapted to press against the adjacent clamping plate and at the opposite end adapted for free rocking movement on the adjusting ring, the intermediate portion of the lever being provided with a surface inclining outwardly towards the first roller and with a second roller whose peripheral surface projects beyond the inclined surface, and a collar encircling the hub including the clutch levers to limit outward displacement of the same by centrifugal force, the collar being shiftable in one direction to ride along the inclined surfaces of the levers to thereby rock the same and press the first rollers against the adjacent clamping plate and to be locked in position by the second rollers.

12. In a clutch, the combination of a friction plate, clamping plates adapted to engage the opposite sides of the friction plate, a hub to which at one end the clamping plates are connected for rotation therewith and for axial movement relative thereto of one of the clamping plates and having a plurality of exteriorly disposed keyways, an adjusting ring mounted on the opposite end of the hub, a clutch lever mounted freely in each keyway and having at one end a first roller adapted to press against the adjacent clamping plate and at the opposite end adapted for free rocking movement on the adjusting ring, an outwardly extending abutment on the lever adjacent the ring, the intermediate portion of each lever being provided with a surface inclining outwardly towards the first roller and having a second roller pivoted thereto whose peripheral surface projects beyond the inclined surface, and a collar encircling the hub including the clutch levers to limit outward displacement of the same by centrifugal force, the collar being shiftable in one direction to ride along the inclined surfaces of the levers to thereby rock the same and press the first rollers against the adjacent clamping plate and to be locked in position by engagement with the second rollers, and in the opposite direction to engage the lever abutments whereby the levers are rocked to released positions.

13. In a clutch, the combination of a friction plate, clamping plates adapted to engage the opposite sides of the friction plate, a hub to which the clamping plates are connected for rotation therewith and for axial movement relative thereto of one of the clamping plate and having depressions disposed around the periphery thereof, clutch levers mounted freely in the depressions and adapted to press the plates into engagement, and means for actuating the levers and for retaining the same in the depressions, the levers being provided with devices for lockingly engaging the actuating means to retain the same in clutch-engaging position.

WILLIAM J. PEARMAIN.